United States Patent
Garn et al.

(10) Patent No.: US 9,004,335 B2
(45) Date of Patent: Apr. 14, 2015

(54) METHOD AND DEVICE FOR MACHINING A WORKPIECE

(75) Inventors: Rüdiger Garn, Niederwiesa OT Braunsdorf (DE); Andreas Lenk, Bannewitz Ot Possendorf (DE)

(73) Assignee: Continental Automotive GmbH, Hannover (DE)

( * ) Notice: Subject to any disclaimer, the term of this patent is extended or adjusted under 35 U.S.C. 154(b) by 323 days.

(21) Appl. No.: 13/514,798

(22) PCT Filed: Dec. 8, 2010

(86) PCT No.: PCT/EP2010/069224
§ 371 (c)(1),
(2), (4) Date: Jun. 8, 2012

(87) PCT Pub. No.: WO2011/070090
PCT Pub. Date: Jun. 16, 2011

(65) Prior Publication Data
US 2012/0234888 A1 Sep. 20, 2012

(30) Foreign Application Priority Data
Dec. 8, 2009 (DE) .......... 10 2009 057 410

(51) Int. Cl.
*B23H 1/00* (2006.01)
*B23H 5/00* (2006.01)
(Continued)

(52) U.S. Cl.
CPC .. *B23H 7/38* (2013.01); *B23H 5/04* (2013.01); *B23K 26/36* (2013.01); *B23H 1/00* (2013.01); *B23K 26/00* (2013.01); *B23H 5/00* (2013.01); *B23H 11/003* (2013.01)

(58) Field of Classification Search
CPC ........ B23H 1/00; B23H 2300/00; B23H 5/00; B23H 5/04; B23K 26/00; B23K 26/36; B23K 26/40; B23K 26/0066; B23K 26/0087; B23K 26/0093; B23K 26/365; B23K 26/367

USPC ............. 219/69.11–70, 121.68, 121.69; 409/141; 72/710; 148/558, 565; 225/1, 225/2, 93, 96
See application file for complete search history.

(56) References Cited

U.S. PATENT DOCUMENTS

| | | | |
|---|---|---|---|
| 2,796,509 A | 6/1957 | Blake | 219/69 |
| 2,969,482 A | 1/1961 | Bruma | 315/207 |

(Continued)

FOREIGN PATENT DOCUMENTS

| | | | |
|---|---|---|---|
| CN | 1396034 A | 2/2003 | B06B 1/02 |
| DE | 12910 | 3/1957 | |

(Continued)

OTHER PUBLICATIONS

Chinese Office Action, Application No. 201080056204.7, 14 pages, Dec. 2, 2013.

(Continued)

*Primary Examiner* — Samuel M Heinrich
(74) *Attorney, Agent, or Firm* — King & Spalding L.L.P.

(57) ABSTRACT

A method and related device for machining a workpiece is provided, wherein material of the workpiece is removed in a machining region by a non-contact removal process. The workpiece is excited by means of an excitation oscillation having a natural resonant frequency of the workpiece, or a composite comprising the workpiece and a coupling element that is rigidly coupled to the workpiece is excited by means of an excitation oscillation having a joint natural resonant frequency of the workpiece and the coupling element. The natural resonant frequency is selected such that in the machining region an oscillation occurs that has a maximum oscillation amplitude in relation to the excitation amplitude of the excitation oscillation.

14 Claims, 1 Drawing Sheet

(51) Int. Cl.
*B23H 5/04* (2006.01)
*B23K 26/00* (2014.01)
*B23K 26/36* (2014.01)
*B23H 7/38* (2006.01)
*B23H 11/00* (2006.01)

(56) References Cited

U.S. PATENT DOCUMENTS

| | | | | |
|---|---|---|---|---|
| 3,567,604 | A | * | 3/1971 | Bodine .................... 205/642 |
| 3,967,515 | A | * | 7/1976 | Nachtigal et al. ........... 82/118 |
| 3,969,604 | A | | 7/1976 | Baardsen ............ 219/121 LM |
| 4,485,286 | A | | 11/1984 | Inoue ................... 219/69.17 |
| 5,286,944 | A | * | 2/1994 | Li .......................... 219/69.15 |
| 5,408,063 | A | * | 4/1995 | Onishi ................... 219/69.14 |
| 5,739,497 | A | | 4/1998 | Tanaka .................. 219/69.14 |
| 6,669,074 | B2 | | 12/2003 | Sato ........................... 228/1.1 |
| 6,734,384 | B2 | | 5/2004 | Barbulescu ............ 219/69.14 |
| 2006/0049055 | A1 | | 3/2006 | Bayer et al. ................. 205/91 |
| 2009/0166335 | A1 | * | 7/2009 | Soloff .................... 219/69.17 |
| 2012/0234888 | A1 | | 9/2012 | Garn et al. ................... 225/1 |

FOREIGN PATENT DOCUMENTS

| | | | | |
|---|---|---|---|---|
| DE | 4219549 | A1 | 12/1993 | ............ B23K 33/00 |
| DE | 102004030762 | A1 | 1/2006 | ............ B23H 3/04 |
| DE | 102004041780 | A1 | 3/2006 | ............ B23H 7/38 |
| EP | 0074274 | A2 | 3/1983 | ............ B29C 57/10 |
| JP | 56009136 | A | 1/1981 | ............ B23H 7/36 |
| WO | 2011/070090 | A1 | 6/2011 | ............ B23H 11/00 |

OTHER PUBLICATIONS

German Office Action, German Patent Application No. 10 2009 057 410.7-34. 4 pages, Nov. 17, 2010.
International PCT Search Report, PCT/EP2010/069224, 11 pages, Mar. 29, 2011.

* cited by examiner

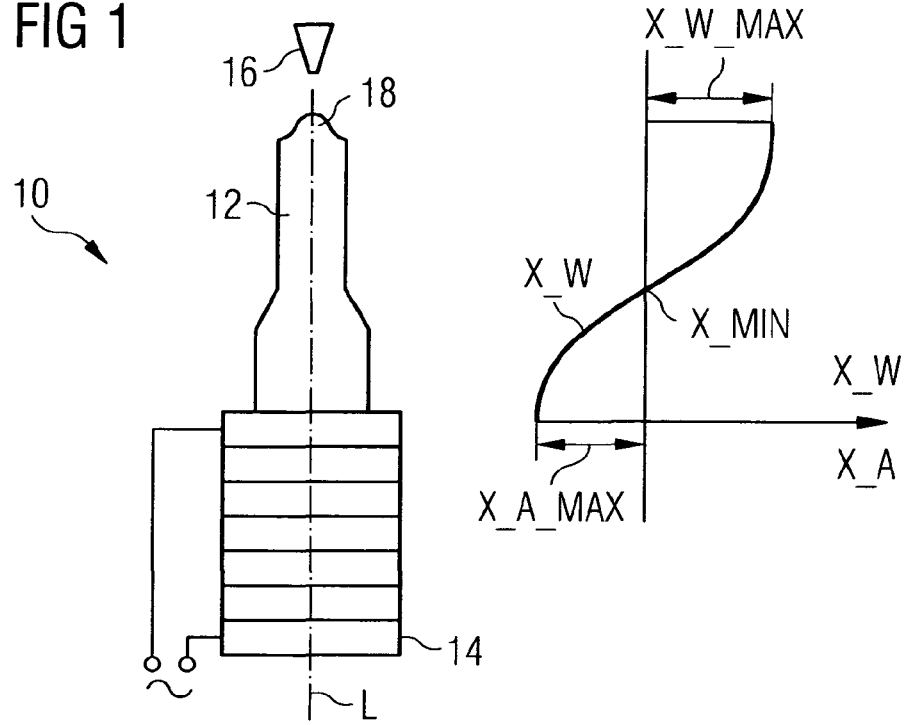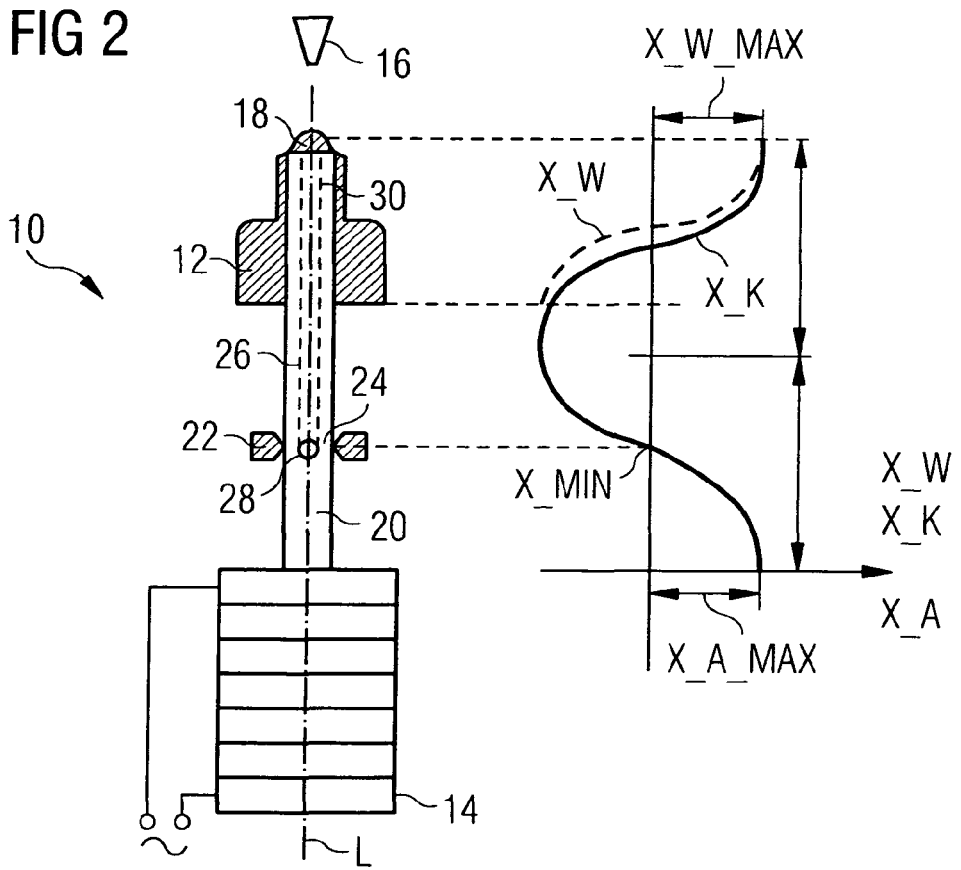

METHOD AND DEVICE FOR MACHINING A WORKPIECE

CROSS-REFERENCE TO RELATED APPLICATIONS

This application is a U.S. National Stage Application of International Application No. PCT/EP2010/069224 filed Dec. 8, 2010, which designates the United States of America, and claims priority to German Application No. 10 2009 057 410.7 filed Dec. 8, 2009, the contents of which are hereby incorporated by reference in their entirety.

TECHNICAL FIELD

This disclosure relates to method and corresponding devices for machining a workpiece, in which material of the workpiece is removed in a machining region by a non-contact removal process.

BACKGROUND

Electroerosion is mentioned as an example of a non-contact removal process. This is based on a material removal between electrically conductive contacts. An electrically conductive contact is formed by a workpiece. A further contact is formed by a shaping tool, for example by a wire. The tool is brought close to the workpiece without coming into contact therewith. By applying an electrical voltage between the tool and the workpiece, an arc or a spark is produced for a short period of time, by means of which material can be detached from the workpiece and removed. If the tool is a thin wire which is fed towards the workpiece in the axial direction, bores can then be introduced in the workpiece, for example bores having a diameter of less than 1 millimeter, for example 0.2 millimeter. Such bores are, for example, restrictor bores in injection valves of internal combustion engines. The formation of such bores can be very time-consuming.

SUMMARY

In one embodiment, a method for machining a workpiece is provided, in which material of the workpiece is removed in a machining region by means of a non-contact removal process, and the workpiece is excited by means of an excitation oscillation having a self-resonant frequency of the workpiece or a combination comprising the workpiece and a coupling element that is coupled rigidly to the workpiece is excited by means of an excitation oscillation having a common self-resonant frequency of the workpiece and the coupling element, wherein the self-resonant frequency is selected such that, in the machining region, an oscillation occurs that has a maximum oscillation amplitude in relation to an excitation amplitude of the excitation oscillation.

In a further embodiment, the workpiece is coupled rigidly to an actuator directly or via the coupling element, in which the actuator excites the workpiece or the combination comprising the workpiece and the coupling element that is coupled rigidly to the workpiece at an oscillation frequency which is equal to the self-resonant frequency of the workpiece or the self-resonant frequency of the workpiece and the coupling element.

In a further embodiment, the maximum oscillation amplitude of the oscillation in the machining region is equal to a maximum oscillation amplitude of the oscillation of the actuator. In a further embodiment, the maximum oscillation amplitude of the oscillation of the actuator is present at a contact point between the actuator and the workpiece or between the actuator and the combination comprising the workpiece and the coupling element that is coupled rigidly to the workpiece. In a further embodiment, the self-resonant frequency of the workpiece is selected in such a way that the direction of the oscillation in the machining region is preferably in a machining direction of the shaping tool. In a further embodiment, the non-contact removal process is electroerosion with a predetermined pulse frequency. In a further embodiment, the non-contact removal process is laser ablation with a predetermined pulse frequency. In a further embodiment, the pulse frequency of the non-contact removal process and the excitation frequency of the actuator are synchronized with one another.

In another embodiment, a device for machining a workpiece is designed to remove material of the workpiece in a machining region by means of a non-contact removal process, and to excite the workpiece by means of an excitation oscillation with a self-resonant frequency of the workpiece or a combination comprising the workpiece and a coupling element that is coupled rigidly to the workpiece by means of an excitation oscillation having a common self-resonant frequency of the workpiece and the coupling element, wherein the self-resonant frequency is selected such that, in the machining region, an oscillation occurs that has a maximum oscillation amplitude in relation to an excitation amplitude of the excitation oscillation.

In a further embodiment, the device has an actuator which is designed to rigidly couple the workpiece directly or via the coupling element. In a further embodiment, the actuator is a piezoelectric actuator. In a further embodiment, the device has a holding device, which is coupled to a section of the coupling element in which an oscillation having a minimum oscillation amplitude occurs. In a further embodiment, the coupling element has a media supply cutout extending in a longitudinal direction of the coupling element, and the media supply cutout has a media inlet, which is arranged in a section of the coupling element in which an oscillation having a minimum oscillation amplitude occurs.

BRIEF DESCRIPTION OF THE DRAWINGS

Example embodiments are explained below with reference to the schematic drawings, in which:

FIG. 1 shows a first example embodiment of a device for machining a workpiece, and FIG. 2 shows a second example embodiment of the device.

DETAILED DESCRIPTION

Some embodiments provide a method and a corresponding device for machining a workpiece. Material of the workpiece may be removed in a machining region by a non-contact removal process. The workpiece may be excited by an excitation oscillation having a self-resonant frequency of the workpiece or a combination comprising the workpiece and a coupling element that is coupled rigidly to the workpiece is excited by an excitation oscillation having a common self-resonant frequency of the workpiece and the coupling element. The self-resonant frequency may be selected in such a way that, in the machining region, an oscillation occurs that has a maximum oscillation amplitude in relation to an excitation amplitude of the excitation oscillation.

Certain embodiments are based on the knowledge that the machining of the workpiece can take place at an accelerated rate if energy in the form of oscillations is supplied to the workpiece in addition to the energy which is supplied directly for the machining. The oscillations can assist in the removal of the material from the workpiece and therefore accelerate this process. The excitation of the workpiece or of the workpiece and the coupling element at a self-resonant frequency permits maximum oscillation amplitudes of the machining region with minimal use of energy. Thus, a high energy efficiency can be achieved. The machining time of the non-contact removal process can be very short. The workpiece can thus be manufactured with a high degree of quality even with mass production. Owing to the short machining time, a cycle time for the machining of the workpiece can be reduced.

In one embodiment of the method, the workpiece is coupled rigidly to an actuator directly or via the coupling element. The actuator excites the workpiece or the combination comprising the workpiece and the coupling element that is coupled rigidly to the workpiece at an oscillation frequency which is equal to the self-resonant frequency of the workpiece or the self-resonant frequency of the workpiece and the coupling element. The compensation of the self-resonant frequencies of the workpiece, the actuator and possibly the coupling element may permit wear-free contact between the workpiece, the actuator and possibly the coupling element.

In a further embodiment of the method, the maximum oscillation amplitude of the oscillation in the machining region is equal to a maximum oscillation amplitude of the oscillation of the actuator. This may provide the advantage that wear on the actuator, the tool and possibly the coupling element can be avoided.

In a further embodiment of the method, the maximum oscillation amplitude of the oscillation of the actuator is present at a contact point between the actuator and the workpiece or between the actuator and the combination comprising the workpiece and the coupling element that is coupled rigidly to the workpiece. This may provide the advantage that wear on the actuator, the tool and possibly the coupling element can be avoided.

In a further embodiment of the method, the self-resonant frequency of the workpiece is selected in such a way that the direction of the oscillation in the machining region is preferably in a machining direction of the shaping tool. Therefore, the non-contact removal process can be performed particularly efficiently.

In a further embodiment of the method, the non-contact removal process is electroerosion at a predetermined pulse frequency. The electroerosion may be a safe and precise non-contact removal process.

In a further embodiment of the method, the non-contact removal process is laser ablation at a predetermined pulse frequency. This may provide the advantage that the laser ablation is a safe and precise non-contact removal process.

In a further embodiment of the method, the pulse frequency of the non-contact removal process and the excitation frequency of the actuator are synchronized with one another. This may provide the advantage that synchronization of the movement of the workpiece with the removal operation and thus particularly safe and precise machining of the machining region is possible.

In a further embodiment, the device has an actuator, which is designed for rigid coupling to the workpiece directly or via the coupling element.

In a further embodiment of the device, the actuator is a piezoelectric actuator. Piezoelectric actuators represent a particularly reliable type of actuator.

In a further embodiment, the device has a holding device, which is coupled to a section of the coupling element in which an oscillation having a minimum oscillation amplitude occurs. This provides the possibility of effective introduction of the holding force into the coupling element and therefore also secure holding and alignment of the workpiece.

In a further embodiment of the device, the coupling element has a media supply cutout extending in a longitudinal direction of the coupling element, and the media supply cutout has a media inlet, which is arranged in a section of the coupling element in which an oscillation having a minimum oscillation amplitude occurs. This may provide the advantage that an operating medium, for example for rinsing the machining region of the workpiece, can be supplied to the machining region of the workpiece via the cutout in a simple manner.

FIGS. 1 and 2 each show an example device 10 for machining a workpiece 12, according to example embodiments. The workpiece may be, for example, part of an injection valve for an internal combustion engine of a motor vehicle. The device 10 has an actuator 14, which is arranged and designed in such a way that energy in the form of mechanical oscillations by excitation of the workpiece 12 can be supplied to the workpiece 12 directly (FIG. 1) or indirectly (FIG. 2). The actuator 14 may be a piezoelectric actuator. Fixing the workpiece 12 and the actuator 14 within a machine (not illustrated in any further detail) may be performed via elements which are designed as spring-mass systems. Thus, transmission of mechanical oscillations to further components of the machine can be avoided.

The device 10 also comprises a shaping tool 16, which can be brought close to a machining region 18 of the workpiece 12. The shaping tool 16 may be guided in such a way that it does not come into contact with the workpiece 12, in particular the machining region 18. Using the shaping tool 16, material of the workpiece 12 can be removed in the machining region 18 by a non-contact removal process.

In one embodiment, the shaping tool 16 may be an electrode. An electrical voltage can be applied between the shaping tool 16 in the form of an electrode and the workpiece 12, said electrical voltage being so high that an arc or a spark can be produced, e.g., temporarily, between the shaping tool 16 in the form of an electrode and the workpiece 12. As a result of the arc or the spark, i.e. as a result of the electrical energy introduced into the workpiece 12, material can be detached from the workpiece 12 in the machining region 18 and removed. Such a removal process is referred to as electroerosion.

In a further embodiment, the shaping tool 16 can be in the form of a laser. In particular, the machining region 18 of the workpiece 12 can be machined by pulsed laser radiation of the shaping tool 16 in the form of a laser, with the result that, by virtue of the introduction of the energy of the pulsed laser, ions are released from the machining region 18 of the workpiece 12 and the material of the workpiece can evaporate in the region 18 of the workpiece 12. Such a removal process performed by a shaping tool 16 in the form of a laser is referred to as laser ablation.

In the example embodiment shown in FIG. 2, the device 10 has a coupling element 20, which is firstly coupled rigidly to the workpiece 12 and secondly coupled rigidly to the actuator 14. The coupling element 20 is designed to transmit the oscillations of the actuator 14 onto the workpiece 12. The coupling element 20 is an expanding mandrel, for example.

The device 10 also has a holding device 22, which is coupled to a section 24 of the coupling element 20, with the result that the workpiece 12 can be held.

In the embodiment shown in FIG. 2, the coupling element 20 has a media supply cutout 26 extending in the direction of a longitudinal axis L of the coupling element 20. The media supply cutout 26 has a media inlet 28, which is arranged in a section of the coupling element 20. Furthermore, the media supply cutout 26 has a media outlet 30, which may be arranged close to the machining region 18 of the workpiece 12. A working medium, for example water or air, can be supplied to the machining region 18 of the workpiece 12 via the media outlet 30 via the media supply cutout 26, with the result that particles which have been detached by the non-contact removal process from the machining region 18 of the workpiece 12 can be washed away with the working medium. Thus, removed material can be cleared from the machining region 18 of the workpiece 12. It is thus possible to avoid a situation in which already removed material impairs further removal of material from the workpiece 12.

An example method for machining the workpiece 12 will be illustrated in detail below.

In the example embodiment shown in FIG. 1, in which the actuator 14 is coupled directly rigidly to the workpiece 12, the actuator 14 excites the workpiece 12 to produce an oscillation X_W having an oscillation frequency which is equal to one of the self-resonant frequencies of the workpiece 12. The self-resonant frequency is in this case selected in such a way that a maximum oscillation amplitude X_W_MAX of the workpiece 12 is reached in the machining region 18. The maximum oscillation amplitude X_W_MAX is in this case determined in particular by a maximum oscillation amplitude X_A_MAX of an oscillation X_A of the actuator 12. The self-resonant frequency of the workpiece 12 is in this case may be selected in such a way that the direction of the oscillation in the machining region 18 may be in a machining direction of the shaping tool 16, which may be advantageous in respect of the non-contact removal process. The maximum oscillation amplitude X_W_MAX of the oscillation in the machining region 18 may be equal to the maximum oscillation amplitude X_A_MAX of the oscillation of the actuator 14. If the workpiece 12 is excited at one of its self-resonant frequencies, it is possible to cause the machining region 18 to oscillate in a targeted manner with minimal expenditure of energy. It is thus possible to implement the method for machining the workpiece 12 with very high energy efficiency. Virtually no wear results at the contact point between the actuator 14 and the workpiece 12, with the result that an industrial application of the device 10 is possible.

In the example embodiment shown in FIG. 2, the combination comprising the workpiece 12 and the coupling element 20 is excited at a common self-resonant frequency of the workpiece 12 and the coupling element 20. The self-resonant frequency is in this case selected in such a way that the oscillation X_W of the workpiece 12 has the maximum oscillation amplitude X_W_MAX in the machining region 18. The actuator 14 excites the workpiece 12 and the coupling element 20 at an oscillation frequency which is equal to one of the common self-resonant frequencies of the workpiece 12 and the coupling element 20. The maximum oscillation amplitude X_W_MAX of the oscillation in the machining region 18 is equal to the maximum oscillation amplitude X_A_MAX of the oscillating of the actuator 14.

Depending on the selected self-resonant frequency of the workpiece 12 and the coupling element 20, one or more oscillation nodes occur in the coupling element 20. In the oscillation nodes, an oscillation X_K of the coupling element reaches a minimum oscillation amplitude X_MIN which can possibly also assume the value zero. In the embodiment shown in FIG. 2, two such oscillation nodes are shown. The holding device 22 may be arranged in the section 24 of the coupling element 20 in which the minimum oscillation amplitude X_MIN is reached. Furthermore, in the embodiment shown here, the media inlet 28 of the media supply cutout 26 is arranged in the section 24 of the coupling element 20 in which the minimum oscillation amplitude X_MIN occurs. If in particular more than two oscillation nodes occur in the coupling element 20, the section of the coupling element 20 in which the media inlet 28 is arranged and the section of the coupling element 20 in which the holding device 22 is arranged can be different from one another. Owing to the minimum oscillation amplitude X_MIN occurring in the oscillation nodes, the medium for rinsing the machining region 18 of the workpiece 20 can be introduced into the media inlet 28 very safely. Furthermore, the device 10 can be held and guided particularly securely by the holding device 22 in the oscillation nodes in which the minimum oscillation amplitude X_MIN is reached.

It may be advantageous if the pulse frequency of the non-contact removal process and the excitation frequency of the actuator 14 are synchronized with one another. The pulse frequency of the electroerosion process or the laser ablation can then correspond to the excitation frequency of the actuator 14 or be an integral multiple thereof.

If the workpiece 12 is in particular part of an injection valve for an internal combustion engine of a motor vehicle, very favorable process conditions in the manufacture of microbores for the injection openings of the injection valve may be achieved by virtue of the excitation at a self-resonant frequency of the workpiece 12 and the occurrence of an oscillation with a maximum oscillation amplitude X_W_MAX in the machining region 18. The machining speed during machining of the workpiece 12 can thus be markedly increased.

What is claimed is:

1. A method for machining a workpiece, comprising:
    physically securing the workpiece to an oscillation actuator,
    arranging a machining region of the workpiece proximate but physically spaced apart from a shaping tool, and
    removing material from the workpiece in the machining region using a non-contact removal process including actuating the oscillation actuator to excite (a) the workpiece using an excitation oscillation having a self-resonant frequency of the workpiece or (b) a combination comprising the workpiece and a coupling element that is coupled rigidly to the workpiece and to the oscillation actuator using an excitation oscillation having a common self-resonant frequency of the workpiece and the coupling element, the excitation of the workpiece acting to remove material from the workpiece by creating an electrical interaction between the machining region of the oscillating workpiece and the spaced-apart shaping tool,
    wherein the self-resonant frequency is selected such that an oscillation occurring in the machining region has a maximum oscillation amplitude corresponding to an excitation amplitude of the excitation oscillation.

2. The method of claim 1, the workpiece being coupled rigidly to the actuator either directly or indirectly via the coupling element, wherein the actuator excites the workpiece or the combination comprising the workpiece and the coupling element that is coupled rigidly to the workpiece at an oscillation frequency which is equal to the self-resonant frequency of the workpiece or the self-resonant frequency of the workpiece and the coupling element.

3. The method of claim 1, wherein the maximum oscillation amplitude of the oscillation in the machining region is equal to a maximum oscillation amplitude of the oscillation of the actuator.

4. The method of claim 2, wherein the maximum oscillation amplitude of the oscillation of the actuator is present at a contact point between the actuator and the workpiece or between the actuator and the combination comprising the workpiece and the coupling dement that is coupled rigidly to the workpiece.

5. The method of claim 1, wherein the self-resonant frequency of the workpiece is selected in such a way that the direction of the oscillation in the machining region is in a machining direction of the shaping tool.

6. The method of claim 1, wherein the non-contact removal process is electroerosion with a predetermined pulse frequency.

7. The method of claim 1, wherein the non-contact removal process is laser ablation with a predetermined pulse frequency.

8. The method of claim 6, wherein the pulse frequency of the non-contact removal process and the excitation frequency of the actuator are synchronized with one another.

9. A device for machining a workpiece, said device comprising:
a shaping tool, and
an oscillation actuator configured to be physically secured to the workpiece and arranged such that a machining region of the workpiece proximate but physically spaced apart from a shaping tool,
wherein the device is configured to remove material of the workpiece in the machining region by a non-contact removal process including actuating the oscillation actuator to excite (a) the workpiece using an excitation oscillation with a self-resonant frequency of the workpiece or (b) a combination comprising the workpiece and a coupling element that is coupled rigidly to the workpiece and to the oscillation actuator using an excitation oscillation having a common self-resonant frequency of the workpiece and the coupling element, the excitation of the workpiece acting to remove material from the workpiece by creating an electrical interaction between the machining region of the oscillating workpiece and the spaced-apart shaping tool,
wherein the self-resonant frequency is selected such that an oscillation occurring in the machining region has a maximum oscillation amplitude corresponding to an excitation amplitude of the excitation oscillation.

10. The device of claim 9, wherein the workpiece is coupled to the oscillation actuator directly or via the coupling element.

11. The device of claim 10, wherein the oscillation actuator is a piezoelectric actuator.

12. The device of claim 9, comprising a holding device coupled to a section of the coupling element in which an oscillation having a minimum oscillation amplitude occurs.

13. The device of claim 9, wherein the coupling element comprises a media supply cutout extending in a longitudinal direction of the coupling element, and the media supply cutout has a media inlet arranged in a section of the coupling element in which an oscillation having a minimum oscillation amplitude occurs.

14. A method for machining a workpiece, comprising:
rigidly securing the workpiece to an oscillation actuator via a coupling element arranged between the workpiece and the oscillation actuator,
arranging a machining region of the workpiece proximate but physically spaced apart from a shaping tool, and
removing material from the workpiece in the machining region using a non-contact removal process including actuating the oscillation actuator to excite the workpiece and the coupling element using an excitation oscillation having a common self-resonant frequency of the workpiece and the coupling element, the excitation of the workpiece acting to remove material from the workpiece by creating an electrical interaction between the machining region of the oscillating workpiece and the spaced-apart shaping tool,
wherein the self-resonant frequency is selected such that an oscillation occurring in the machining region has a maximum oscillation amplitude corresponding to an excitation amplitude of the excitation oscillation.

* * * * *